United States Patent [19]

Dean

[11] 4,317,174
[45] Feb. 23, 1982

[54] RISER ANGLE POSITIONING SYSTEM AND PROCESS

[75] Inventor: Q. Wayne Dean, Simonton, Tex.

[73] Assignee: The Offshore Company, Houston, Tex.

[21] Appl. No.: 125,804

[22] Filed: Feb. 28, 1980

[51] Int. Cl.³ .................. E21B 44/00; G06F 15/20
[52] U.S. Cl. .................................. 364/432; 114/264; 364/453; 405/195
[58] Field of Search ............. 364/432, 453; 405/195; 175/5; 114/144, 264

[56] References Cited

U.S. PATENT DOCUMENTS

| | | | |
|---|---|---|---|
| 3,010,214 | 11/1961 | Postlewaite | 114/144 B X |
| 3,191,570 | 6/1965 | Henderson | 114/144 B |
| 3,413,946 | 12/1968 | Von Schultz | 175/5 X |
| 3,760,875 | 9/1973 | Busking | 114/264 X |
| 3,872,284 | 3/1975 | Seligman et al. | 364/453 |
| 3,965,840 | 6/1976 | Blumberg | 364/432 X |
| 3,974,792 | 8/1976 | Burnell et al. | 364/432 X |
| 4,017,823 | 4/1977 | Cooke et al. | 364/432 X |
| 4,031,544 | 6/1977 | Lapetina | 175/5 |
| 4,051,350 | 9/1977 | Parent | 364/432 |
| 4,182,584 | 1/1980 | Panicker et al. | 405/195 |
| 4,188,156 | 12/1980 | Fisher et al. | 405/195 |
| 4,205,379 | 5/1980 | Fox et al. | 364/432 |

Primary Examiner—Felix D. Gruber
Attorney, Agent, or Firm—Bradford E. Kile

[57] ABSTRACT

A riser angle positioning system and process provides information for dynamically positioning a floating vessel having a riser extending to a wellhead on the ocean floor. The system comprises an acoustic system for generating acoustic data signals representing the position of the vessel with respect to the wellhead, top and bottom riser inclinometers for generating respective sensor signals indicating angles of deflection of the riser at the top and bottom, respectively, thereof, and a processor responsive to the acoustic data signals and the sensor signals for generating positioning information. The riser angle positioning system and process serve as a backup system and method for checking the acoustic data for large errors, and additionally provide the sole position determining system and method in case of acoustic blackout. The riser angle positioning system and process have two alternative modes of operation: a simulator mode during which the vessel position is calculated from data read from a dynamic positioning system magnetic tape log, and a real time mode during which data is read directly from analog-to-digital converters associated with the top and bottom inclinometers and the acoustic system.

54 Claims, 13 Drawing Figures

FIG. 1
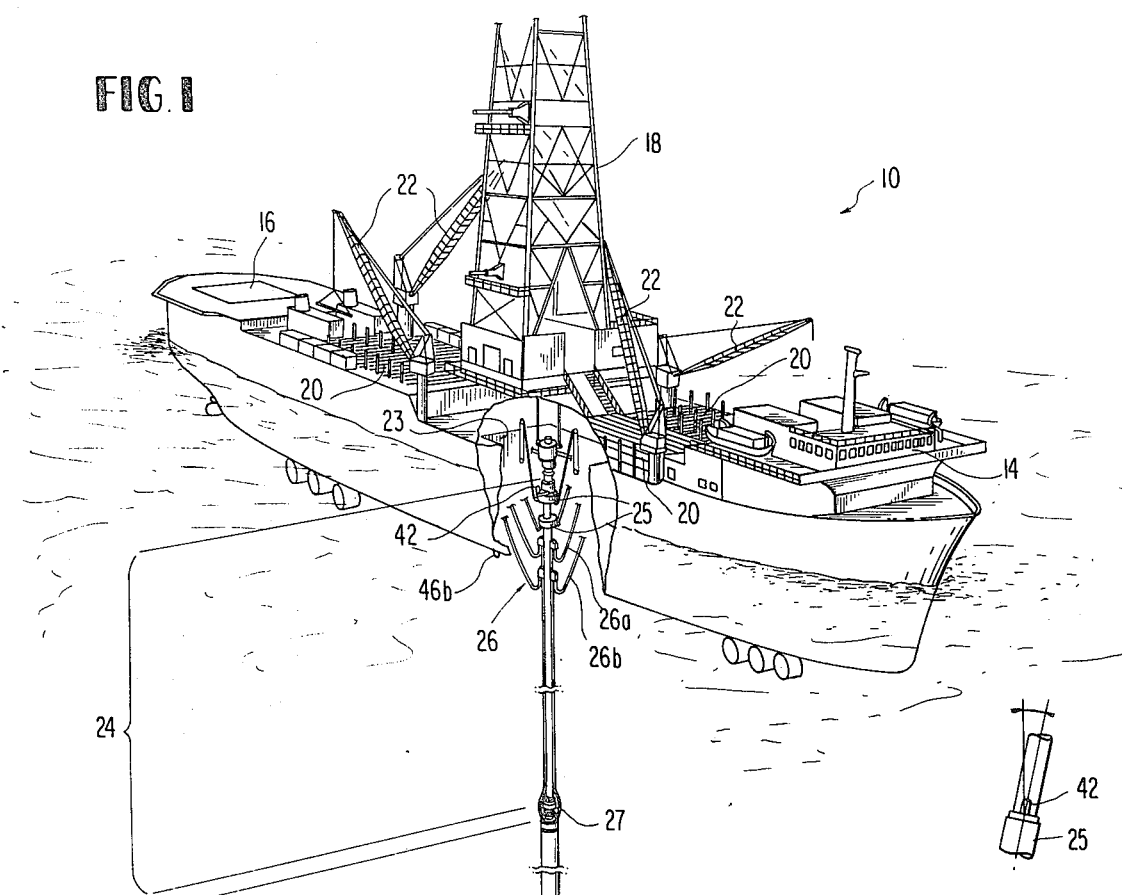
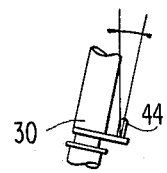
FIG. 1A
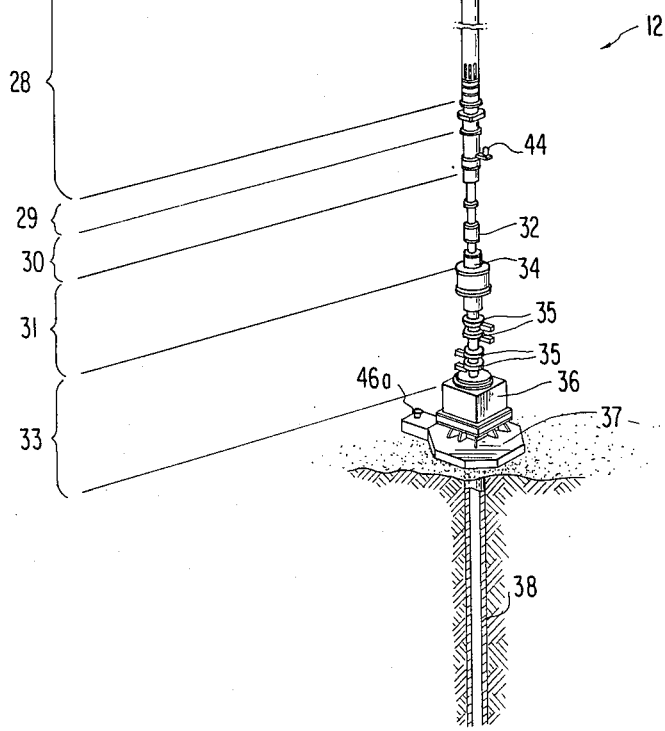
FIG. 1B

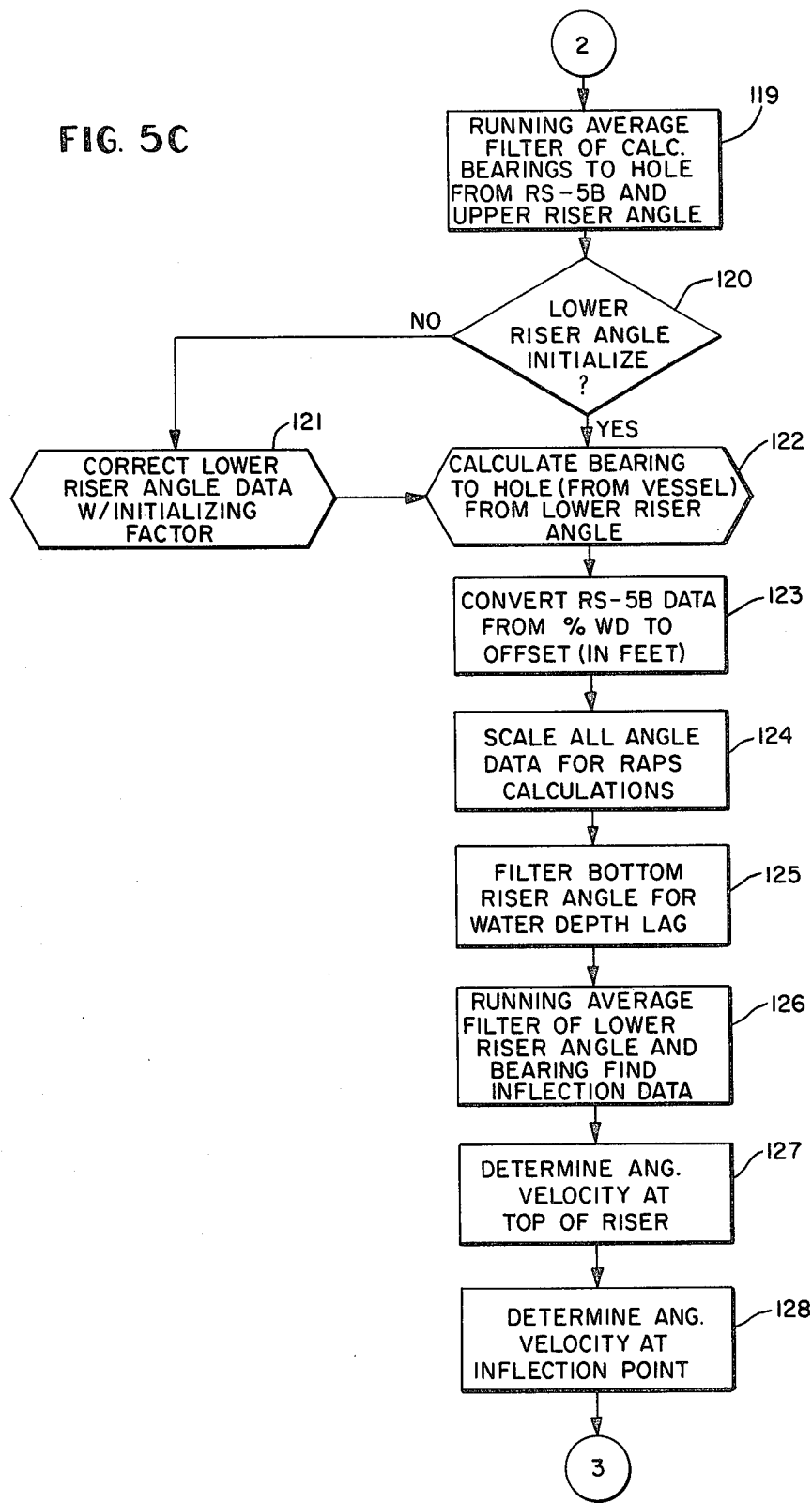

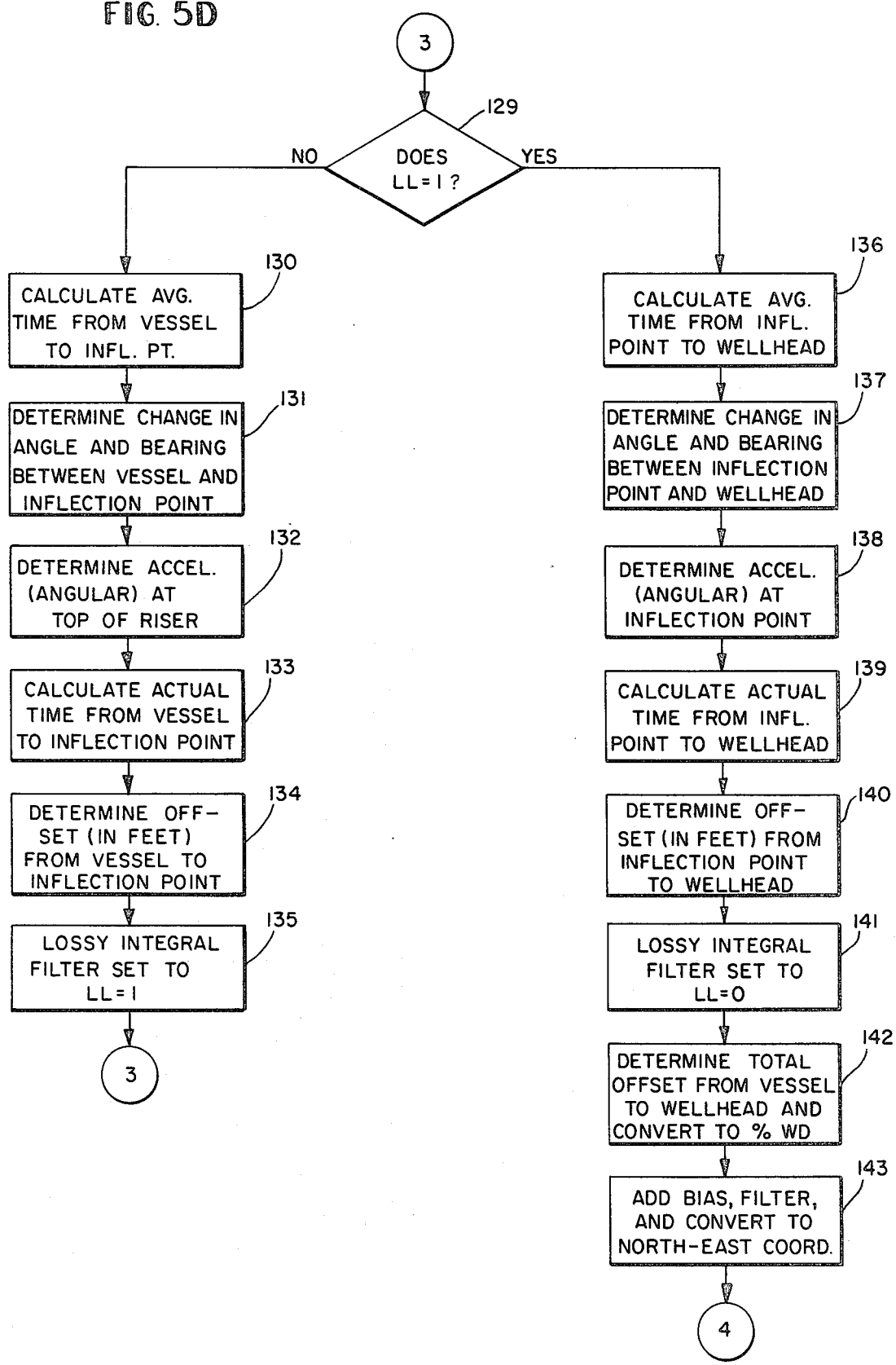

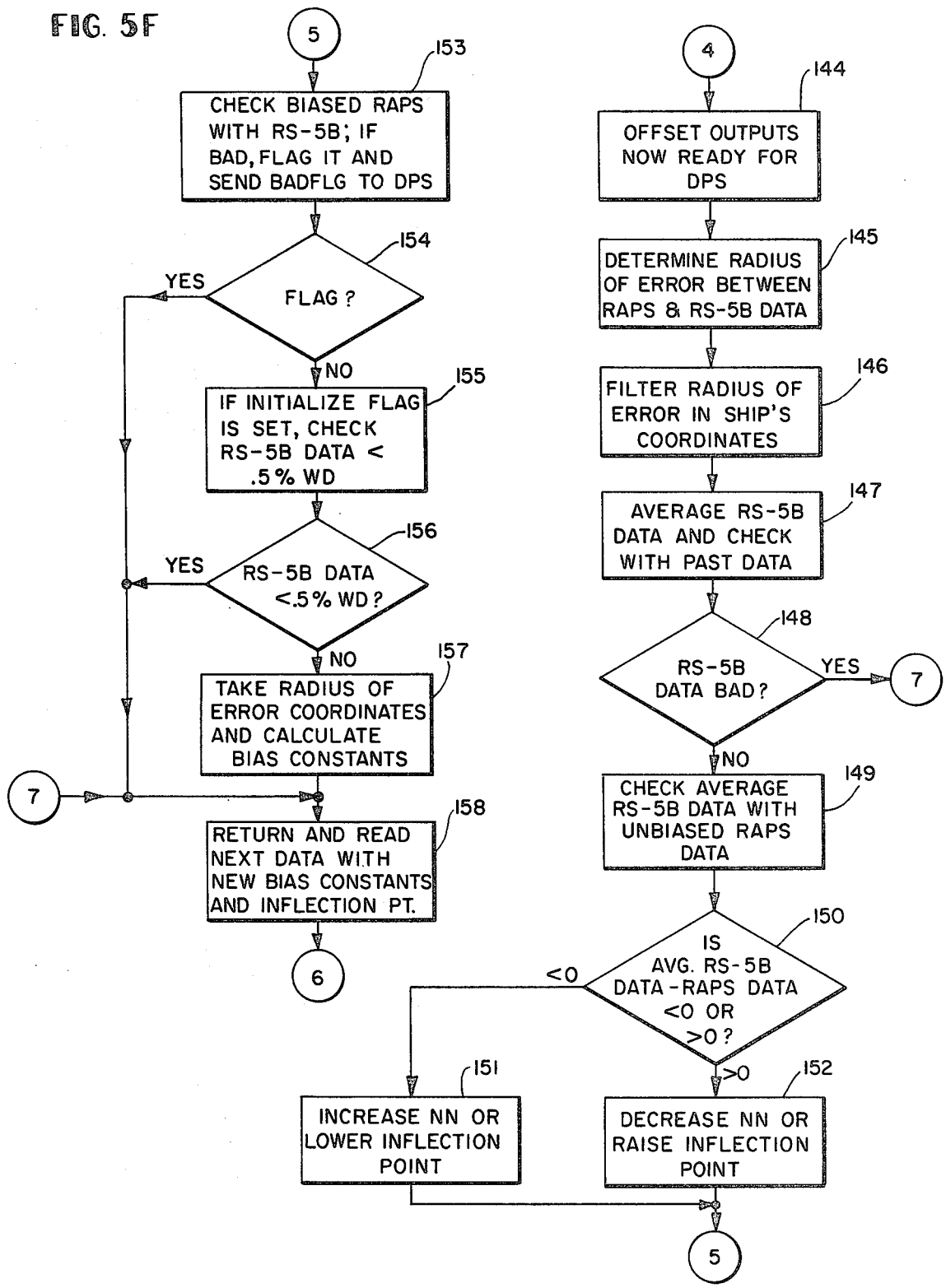

RISER ANGLE POSITIONING SYSTEM AND PROCESS

BACKGROUND OF THE INVENTION

This invention relates to a system and process or method for maintaining the position of a floating offshore installation with respect to a seabed site. More specifically, this invention relates to a system and method for geometrically determining the position of a floating offshore installation over a wellhead.

In the past, offshore installations have been extensively utilized around and upon the continental shelf regions of the world. Examples of offshore facilities include supports for radar stations, light beacons, scientific and exploration laboratories, chemical plants, power generating plants, mining stations, etc. Principally, however, offshore facilities have been utilized by the oil and gas industry in connection with drilling, production and/or distribution operations.

In the initial stages of offshore drilling/production activity, operations were conducted along the near shore portions of the Gulf of Mexico in swamp or marshlands and seaward to water depths of 100 feet or more. In such depths, fixed length towers or platforms have been extensively utilized.

In an attempt to keep pace with a burgeoning worldwide energy demand, more recent offshore activity has become decidedly more aggressive. In this regard, floating drillships which are dynamically positioned and/or turret moored have operated in water depths of up to approximately 5,000 feet. If the present trend of spiralling price levels for crude oil continues, the only offshore depth limitations for drilling and production of oil will be the technological capability of the equipment.

Drillship operations are conducted vertically through a moon pool, or a well, in the ship hull. A riser is lowered through the moon pool from one or more tensioner rings to the seabed and a bit and drill string are lowered concentrically within the riser for drilling into the seabed. During drilling, a compressed, mud slurry, is continuously pumped down the drill string, out the bit and back up the riser in the annulus between the exterior of the drill string and interior of the riser. In deep water, the weight of the riser column can become substantial. Accordingly, it is critical to maintain the riser in a generally vertical posture to prevent over stressing and "kinking" the riser conduit.

In the past, various systems and methods have been envisioned for determining the position of a vessel relative to a seabed site. However, as will be seen below, such systems and methods have been burdened by various disadvantages, including inaccuracy, lack of economy, and inefficiency or ineffectiveness.

One previously known system is directed to horizontally stabilizing a floating structure with strain gauge sensors secured to a casing at a point above and adjacent to the seabed. These gauges are connected to electric motors on a platform located at the water's surface. Sensed movement of the casing activates assemblies for stabilizing the horizontal position of the drilling platform. Such a system has several disadvantages, primary of which resides in the fact that the system is not designed so as to provide accurate positioning information for determining the position of the platform.

Other systems disclose vessel positioning by the use of an assemblage which is movable along a drill string so as to determine the angular deviation from the vertical at various elevations along the drill string. In this regard, the angular deviation from the vertical is sensed by a pendulum apparatus which generates electrical signals indicative of position. These electrical signals are then utilized to determine the relative angular displacement of the pendulum with respect to an assemblage carriage. However, such a system is also burdened with disadvantages. First, this system is hampered, in its effectiveness, by lack of accuracy in computing the position information. Second, the system is, by its very nature (being mechanical in part), subject to error induced by outside elements (for example, rough sea, bad weather, etc.).

Still further acoustic systems have been utilized for dynamically positioning vessels. One system comprises a ship, used as a drilling platform, which is dynamically positioned through the use of acoustic transmitters mounted on the base of a well. Signals produced by the transmitters are received aboard ship by one or more microphones. Whereas such acoustic systems represent an advance over previously known devices, such systems can conceivably fail to function (that is, experience a "blackout") during which failure time data cannot be obtained. Moreover, such previously known systems are still somewhat burdened by inaccuracy in the process of position determination.

In yet another acoustic system, a drilling platform is positioned over a bore hole and a plurality of acoustic transponders are positioned on the seabed around the bore hole. Corresponding transducers are mounted on a lower end of a spar buoy hull for receiving signals. This system also features the use of a photoelectric position indicating device, which can be used to position the buoy. Again, such an acoustic system possesses certain disadvantages such as previously noted.

Recent emphasis on drilling operations in increasingly deep waters has resulted in increasing concern with prior systems. In this regard, it would be desirable to provide positioning systems and methods which have superior reliability. Additionally it would be highly desirable to provide a reliable position reference to be used as a backup for acoustic reference system. Various techniques, such as a taut wire, lower riser angle, inertial reference and radio systems, have been used as back-up systems with varying success, depending upon the water depth and the weather conditions. In many cases, however, the high cost and/or low reliability of such back-up systems have effectively precluded them from serious consideration.

The difficulties suggested in the preceeding are not intended to be exhaustive, but rather are among many which tend to reduce the effectiveness and user satisfaction of prior positioning systems. Other noteworthy problems may also exist; however, those presented above should be sufficient to demonstrate that positioning systems and processes, particularly of the mechanical, electro-mechanical and acoustic type, appearing in the past will admit to worthwhile improvement.

OBJECTS OF THE INVENTION

It is, therefore, a general object of the invention to provide a novel positioning system and process or method which will obviate or minimize difficulties of the type previously described.

It is a specific object of the invention to provide a novel positioning system and method wherein a riser extends from the ocean floor to a floating vessel, and wherein riser angle sensors and an acoustic system are used, in combination, to generate data for use in positioning of the vessel.

It is another object of the invention to provide a positioning system and method employing an acoustic system generally comprising beacons placed on the ocean floor, which beacons generate acoustic signals that are detected by sensors mounted in the hull of a ship.

It is a further object of the invention to provide a positioning system and method which utilize riser angle sensors to create a dynamic model of the riser to determine vessel position, such system and method serving as a backup system and method to check acoustic data for large errors, and additionally to comprise the sole position determining means in the case where there is an acoustic blackout.

It is yet another object of the invention to provide a positioning system and method wherein inclinometers are positioned only at the top and bottom of the riser, the riser angle at some intermediate point of the riser being determined by interpolating data generated by the acoustic system plus data generated by the inclinometers at the top and bottom of the riser.

It is still another object of the invention to provide a positioning system and method which fit a curve represented by a three-dimensional, second-order algorithm between the top of the riser and an intermediate point on the riser, tangent to the top riser angle at the top and tangent to the interpolated angle at the intermediate point, and which then fit the curve (represented by the three-dimensional, second-order algorithm) between the intermediate point and the bottom of the riser, tangent to the interpolated angle at the intermediate point and tangent to the bottom riser angle at the bottom.

It is a further object of the invention to provide a positioning system and method wherein, if acoustic data is considered valid data, the distance calculated by means of the three-dimensional, second-order algorithm is compared with the acoustic distance, and the intermediate point is then incremented or decremented to provide closer comparisons.

It is yet a further object of the invention to provide a positioning system and method wherein, if bad acoustic data is detected, it is rejected and the operator is notified, the intermediate point and the algorithm constants being "frozen" until the system indicates that the acoustic data can be used as valid data.

It is yet a further object of the invention to provide a positioning system and method wherein stability will be maintained and accurate vessel position data given, even during an acoustic blackout.

Finally, it is a still further object of the invention to provide a positioning system and method having a simulator mode, during which various parameters and constants are calculated and used to "tune" the system, and a real time mode, during which analog data inputs are used to derive analog position reference signals for positioning the vessel.

BRIEF SUMMARY OF A PREFERRED EMBODIMENT OF THE INVENTION

A preferred embodiment of the invention which is intended to accomplish at least some of the foregoing objectives comprises a riser angle positioning system and method for positioning a floating vessel having a riser extending to the ocean floor. The riser angle positioning system comprises: an acoustic system, including beacons located on the ocean floor, for generating acoustic data signals representing the vessel position with respect to a wellhead; top and bottom inclinometers, positioned at the top and bottom, respectively, of the riser, for generating respective sensor signals indicating the respective angles of the riser at the top and bottom, respectively, and a processor responsive to the acoustic data signals and to the respective sensor signals for interpolating the acoustic data signals and the respective angles of the riser at the top and bottom, respectively, so as to generate data for positioning the floating vessel.

The riser angle positioning system and method are intended to serve as a backup system and method for checking acoustic data for large errors, and additionally provide the sole position determining means in the case where there is an acoustic blackout. If the positioning system and method determine that the acoustic data is considered valid, the distance calculated by means of a three-dimensional, second-order algorithm is compared with the acoustic distance, and the intermediate point is then incremented or decremented to provide closer comparisons. If bad acoustic data is detected, the data is rejected and the operator is notified, the intermediate point and the algorithm constants being frozen until the system indicates that the acoustic data can be used as valid data.

The system and method of the present invention utilize a dynamic positioning system, to which positioning data generated by the riser angle positioning system processor is provided as a vessel position reference.

Preferably, the system and method have two modes of operation: a simulator mode and a real time mode. In the simulator mode, the vessel position is calculated from data read from the dynamic positioning system (for example, from the magnetic tape log thereof). When operating in the real time mode, the system reads its data directly from analog-to-digital converters (provided with each of the top and bottom inclinometers, and the acoustic system), and calculates the position of the vessel. In both modes of operation, a permanent record (for example, a hard copy plot) is provided as an output for selected channels. In the real time mode, position coordinates are provided as an output from digital-to-analog converters (provided between the riser angle positioning system and the dynamic positioning system) for direct input into the dynamic positioning system.

THE DRAWINGS

Other objects and advantages of the present invention will become apparent from the following detailed description of a preferred embodiment thereof, taken in conjunction with the accompanying drawings, wherein:

FIG. 1 is a diagrammatic representation of a riser system with which the riser angle positioning system and method of the present invention are utilized;

FIG. 1A is a detailed view of an upper riser angle indicator;

FIG. 1B is a detailed view of a lower riser angle indicator;

FIGS. 5A through 5F are detailed flowcharts of the operations performed by the riser angle positioning system processor in performing those general operations just stated with respect to FIG. 4.

DETAILED DESCRIPTION

Context of the Invention

Figure 2:
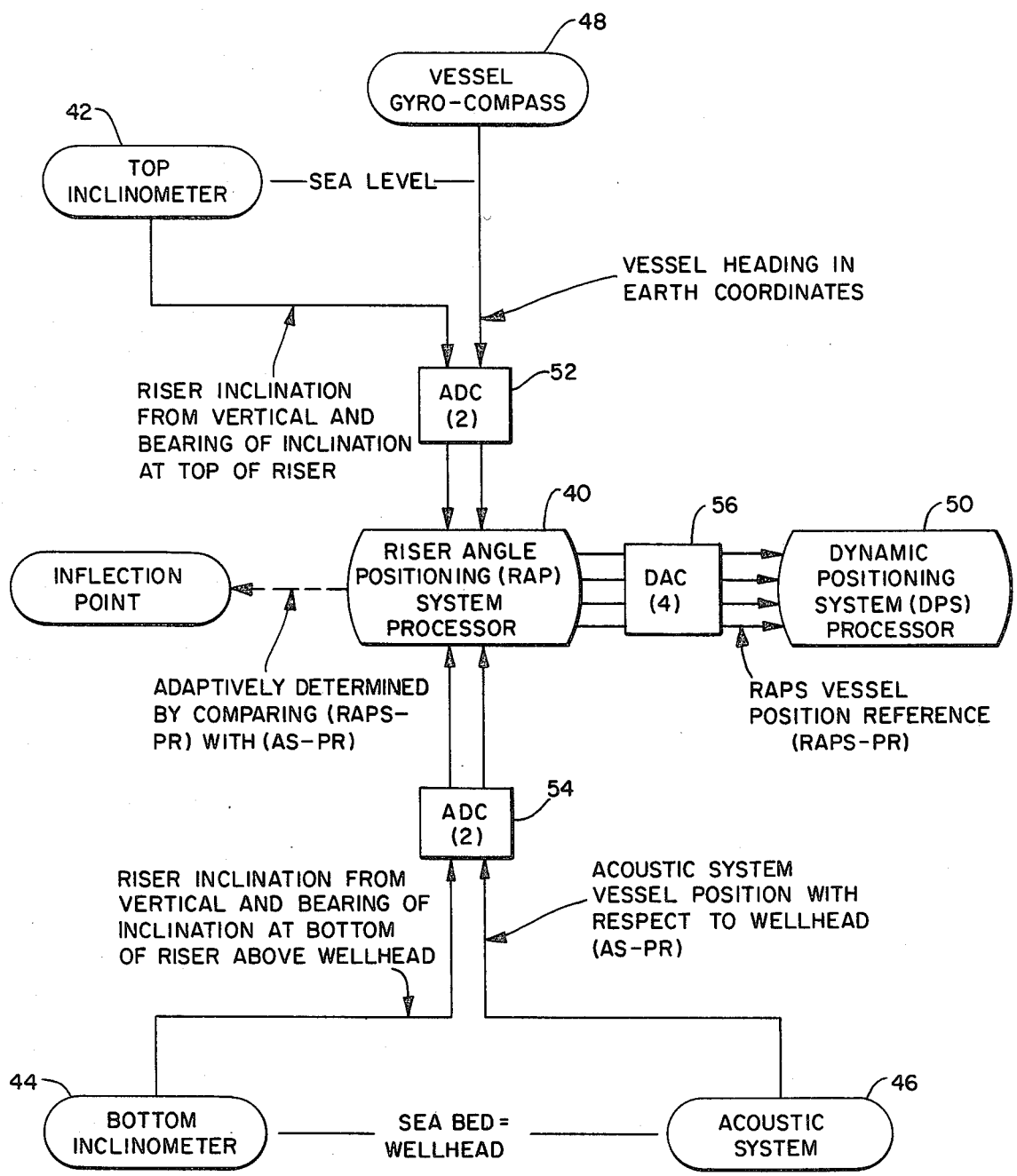
FIG. 2 is a block diagram of the system of the present invention, including a riser angle positioning system processor, a dynamic positioning system processor, top and bottom inclinometers, a vessel gyro-compass, and an acoustic system.

Before presenting a detailed description of the subject riser angle positioning (RAP) system and process, it may be worthwhile to briefly outline the context of the instant invention. In this connection, FIG. 1 depicts a typical drillship 10 and riser system 12 with which the RAP system and method of the present invention may be advantageously utilized.

The drillship 10 may be of a type rated for unrestricted worldwide ocean use and drilling in water of up to 6,000 feet in depth with a designed drilling capacity of up to 25,000 feet. The ship is fitted with a pilot house and control center 14 on the bow with a heliport 16 and crew quarters astern. A conventional derrick 18 is erected amidships with a plurality of pipe racks 20 positioned fore and aft which are tended by working cranes 22. A moon pool 23 extends vertically through the center of the drillship and is dynamically stationed over a desired well site by retractable thrusters extending downwardly from the fore and aft sections of the ship hull.

The riser system 12 includes a telescopic joint assembly 24 having one or more riser tensioning units 25 and a plurality of control lines 26 such as kill and choke lines 26a and multiplex control cables 26b. A ball joint 27 connects the telescopic joint assembly onto a buoyancy riser joint 28 which in turn connects onto a mud discharge unit 29. A riser tension sub 30 is mounted downstream of the mud discharge joint and includes riser tension and mud temperature sensors. A lower marine riser package 31 connects to the tension sub which includes a flex joint 32, T.V. camera assembly, riser adapter and emergency recovery system, etc. A blowout preventer package 33, including annular 34 and ram type 35 preventers, is positioned directly over a permanent 36 and temporary 37 guide base mounted upon a drill hole 38.

In accordance with the present invention, an upper electric riser angle indicator 42 is located at approximately sea level and is preferably mounted on the upper riser tensioner ring 25 (Note FIG. 1A). Furthermore, a bottom electric riser angle indicator 44 is located at the riser tension sub in general proximity to the seabed (Note FIG. 1B). These electric riser angle indicators are of a conventional design and may correspond for example to Honeywell angle indicator No. 37270541-001.

Finally, an acoustic beacon assembly 46 is provided comprising one or more beacons 46a located in proximity to the permanent guide base 36 and one or more hydrophones 46b (three hydrophones are preferable) mounted upon the hull of the ship.

Riser Angle Positioning System and Method

Turning now to the remaining drawings, visibly, FIGS. 2 through 4 and 5A through 5F, the riser angle positioning system and method of the present invention will now be described.

As seen in FIG. 2, the RAP system and method employ a RAP system processor (central processing unit or CPU) 40, top and bottom inclinometers 42 and 44, respectively, an acoustic system 46 providing an acoustic system reference (an acoustic system vessel position with respect to wellhead, as obtained by processing of acoustic signals), a conventional vessel gyro-compass 48, and a dynamic positioning system (DPS) processor (central processing unit or CPU) 50.

In operation, the top and bottom inclinometers 42 and 44, the acoustic system 46, and the vessel gyro-compass 48 provide analog data signals to corresponding analog-to-digital converters (ADC's), depicted by blocks 52 and 54. Preferably, individual ADC's are provided for each analog data signal. ADC's 52 and 54 convert the corresponding analog signals to digital form, and provide the corresponding digital inputs to RAP system processor 40. In a manner to be described in more detail below, the processor 40 interpolates this data so as to compute the riser angle (inflection angle) and bearing at a point (the inflection point) intermediate between the top and bottom inclinometers 42 and 44, respectively. More specifically, as will be seen below, the processor 40 determines the inflection point (angle and bearing) in an adaptive manner by comparing a RAP system vessel position reference (RAPS-PR) with the acoustic system vessel position with respect to the wellhead (AS-PR), the latter being provided by the acoustic system 46 via one of the ADC's 54.

As will also be discussed in detail below, the processor 40 fits a three-dimensional, second-order algorithm between the top of the riser and the intermediate point on the riser, tangent to the top riser angle at the top and tangent to the interpolated angle at the intermediate point. The processor then fits the curve (represented by the three-dimensional, second-order algorithm) between the intermediate point and the bottom of the riser, tangent to the interpolated angle at the intermediate point and tangent to the bottom riser angle at the bottom.

Processor 40, in the manner generally described above and to be described in more detail below, derives digital signals representing the RAP system vessel position reference (RAPS-PR), and provides these digital signals to individual digital-to-analog converters (DAC's) 56, wherein the digital signals are converted to analog form. The resulting analog outputs are provided to the dynamic positioning system processor 50.

It is to be understood that any one of several readily available processors may be used to implement the RAP system processor 40 and the DPS processor 50. For example, the RAP system processor 40 can be implemented by a PDP-8 minicomputer (manufactured by Digital Equipment Corporation), while the DPS processor 50 can be implemented by a Honeywell H316 computer (manufactured by Honeywell Information Systems, Inc.).

It is to be further understood that inter-processor communication between the RAP system processor 40 and the DPS processor 50 could be accomplished without the use of the DAC's 56, that is, by providing digital-to-digital communication. However, in a preferred embodiment, the DAC's 56 are provided between processors 40 and 50 so as to minimize software processing necessary within the processors 40 and 50, respectively.

The RAP system processor 40 receives the following analog-to-digital converted signals: (1) gyro sine and cosine coordinates from the vessel gyro-compass 48; (2) the upper riser angle North and East coordinates (RAI) from the top inclinometer 42; (3) the lower riser angle North and East coordinates (ERA) from the bottom inclinometer 44; (4) the RS5 forward and starboard coordinates from the acoustic system 46; and (5) the RS5 alarms from the acoustic system 46.

As will be explained in more detail below, the RAP system processor utilizes this input to calculate the vessel heading, converts the upper and lower riser angles to the true North and East coordinates with the aid of the mounting bearings provided at start-up by the operator, and does a coordinate conversion of the RS5 data (using the calculated vessel heading) to get the coordinates in true North and East coordinates. The RS5 and the riser angle coordinates, after filtering, are utilized in position calculation.

Figure 3:
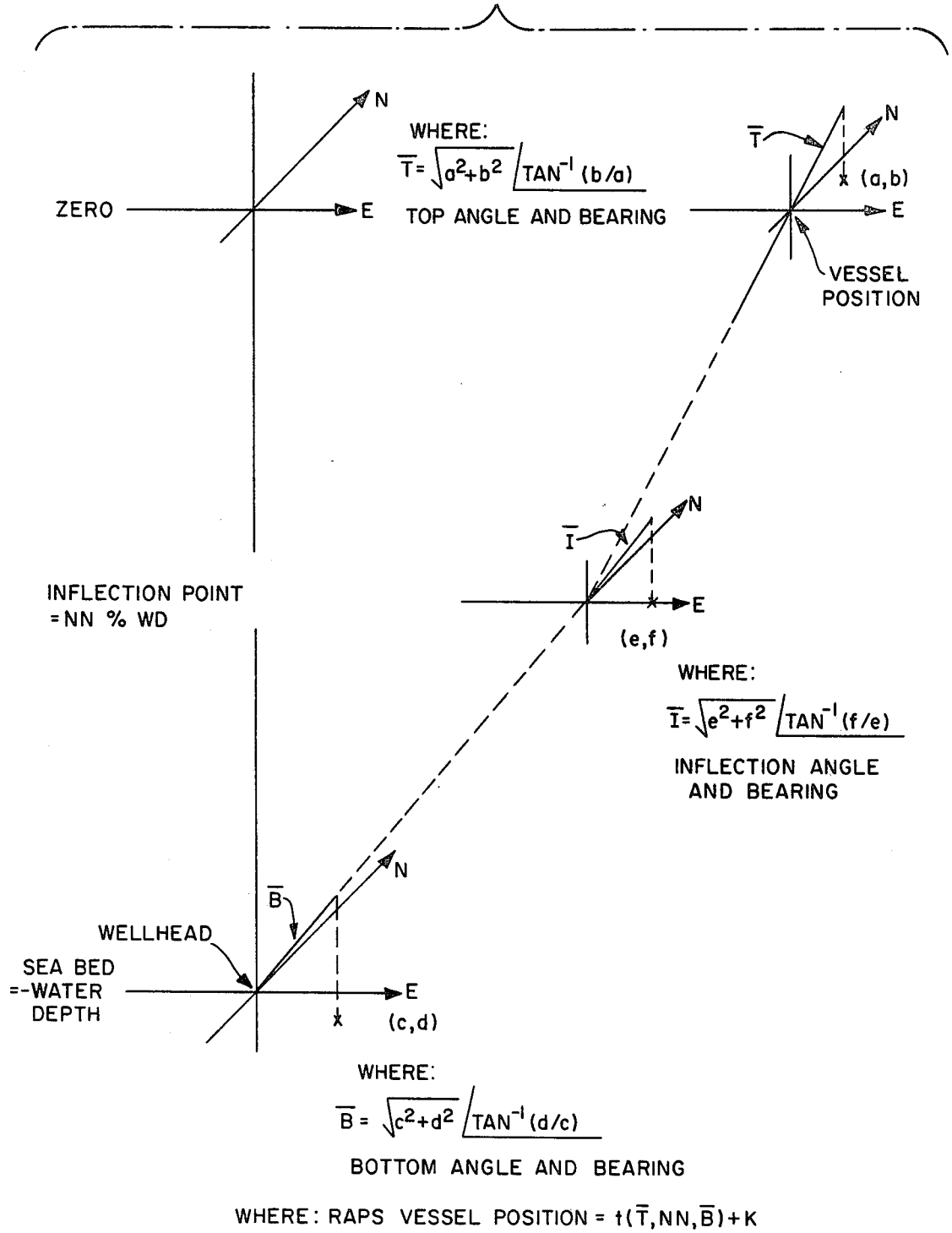
FIG. 3 is a diagram used in illustrating the manner in which the riser angle positioning system and method calculate the vessel position and inflection angle and bearing, such being calculated from the top angle and bearing and the bottom angle and bearing.

As indicated in FIG. 3, position calculation utilizes the upper and lower riser angles and their respective bearings. The symbols T, I and B are vector quantities corresponding to the top angle and bearing, inflection angle and bearing, and bottom angle and bearing, respectively. As the upper riser angle and lower riser angle are provided as an input to the RAP system as the x and y coordinates (North and East coordinates) of the angle and bearing, the angle is calculated as the magnitude of the vector and the bearing is the arc tangent of the y component divided by the x component. Thus, the top angle and bearing, vector T, are given by the equation at the top of FIG. 3, the inflection angle and bearing, vector I, are given by the equation at the middle of FIG. 3, and the bottom angle and bearing, vecor B, are given by the equation at the bottom of FIG. 3.

The position calculation procedure implemented by the RAP system utilizes the upper and lower riser angles, and their respective bearings, as follows. It is known, that somewhere along the riser, the slope and bearing of the slope are equal to the average of the top and bottom riser angles and bearings. It is assumed that the angle average and the bearing average occur at the same point on the riser. This assumption has proved reliable in cases studied in relation to the system and method of the present invention. This point along the riser (referred to as the "inflection point") is initially set to 50% of the water depth. The RAP system then solves a second-order differential equation to determine the X and Y coordinates of the distance from the top of the riser to the inflection point, and then performs the same operation with respect to the distance from the inflection point to the bottom of the riser. The two X and Y coordinates are then added to get the total separation between the top of the riser and the bottom of the riser. These total X and Y coordinates (referred to as XT and YT) are then corrected by the constants XO and YO (initially set to zero), thus giving XTO and YTO. XTO and YTO are then processed by a lossy integral filter, and then readied for output.

When the system of the present invention is in the real time mode, these filtered values of XTO and YTO are provided as an output to the DPS processor 50 after being converted to engineering units of degrees North and degrees East. The DPS processor 50 will assume this to be the lower riser angle, and will perform a straight line approximation for small angles to determine the vessel offset. If the system is in the simulator mode of operation, the data XTO and YTO are converted into ship's coordinates to be plotted for comparison with the RS5 input data (the acoustic data from the acoustic system 46), such comparison taking place in the RAP system processor 40. It is to be noted that, in the real time mode of operation, the data XTO and YTO form the first two outputs provided by the RAP system processor 40, via DAC's 56, to the DPS processor 50.

As will also be discussed in more detail below, the RAP system processor 40 then compares present values of RS5 data (acoustic data) with past data to determine if the RS5 data is reliable. The processor 40 also checks for RS5 alarms.

As a continuing calculation, XT and YT are then compared with the RS5 data, and the coordinate of the inflection point is either increased or decreased to make the values compare more closely.

At this juncture, the processor 40 also checks data XTO and YTO to determine if they look like valid data. Moreover, comparison with the RS5 data is made only if the RS5 data has been considered valid. As will be discussed in more detail below, the processor 40 completes its cycle of operation by making various validity checks, error checks, etc., and setting appropriate flags, as needed. Two such flags are: CPRFLG, a RAP system flat (plot parameter) indicating an inflection point and/or if the RS-5B (acoustic) data is bad; and BADFLG, a flag set and sent to the DPS processor 50, indicating that the XTO and YTO are in error (that is, they differ from RS5 data by more than a preset limit), at which point the RAP system processor 40 automatically returns for a new set of data. These latter two flag outputs from the RAP processor 40 form the third and fourth of the four outputs provided, via DAC's 56, to the DPS processor 50.

After the system has been checked for re-initialization, the RAP system processor 40 is ready to read the next set of data, re-initialized if required, and to calculate the next vessel position. In the simulator mode of operation, this procedure will continue until some termination time, called for in the plot routine (in the software of processor 40), is reached. It will then terminate the plot, and ask the operator if additional plots are required. In the real time mode of operation, the RAP system processor 40 will continue executing its program until failure of one of the ADC's 52 and 54 or DAC's 56 is noted, or until the operator requests to make a change by keyboard entry.

Figure 4:
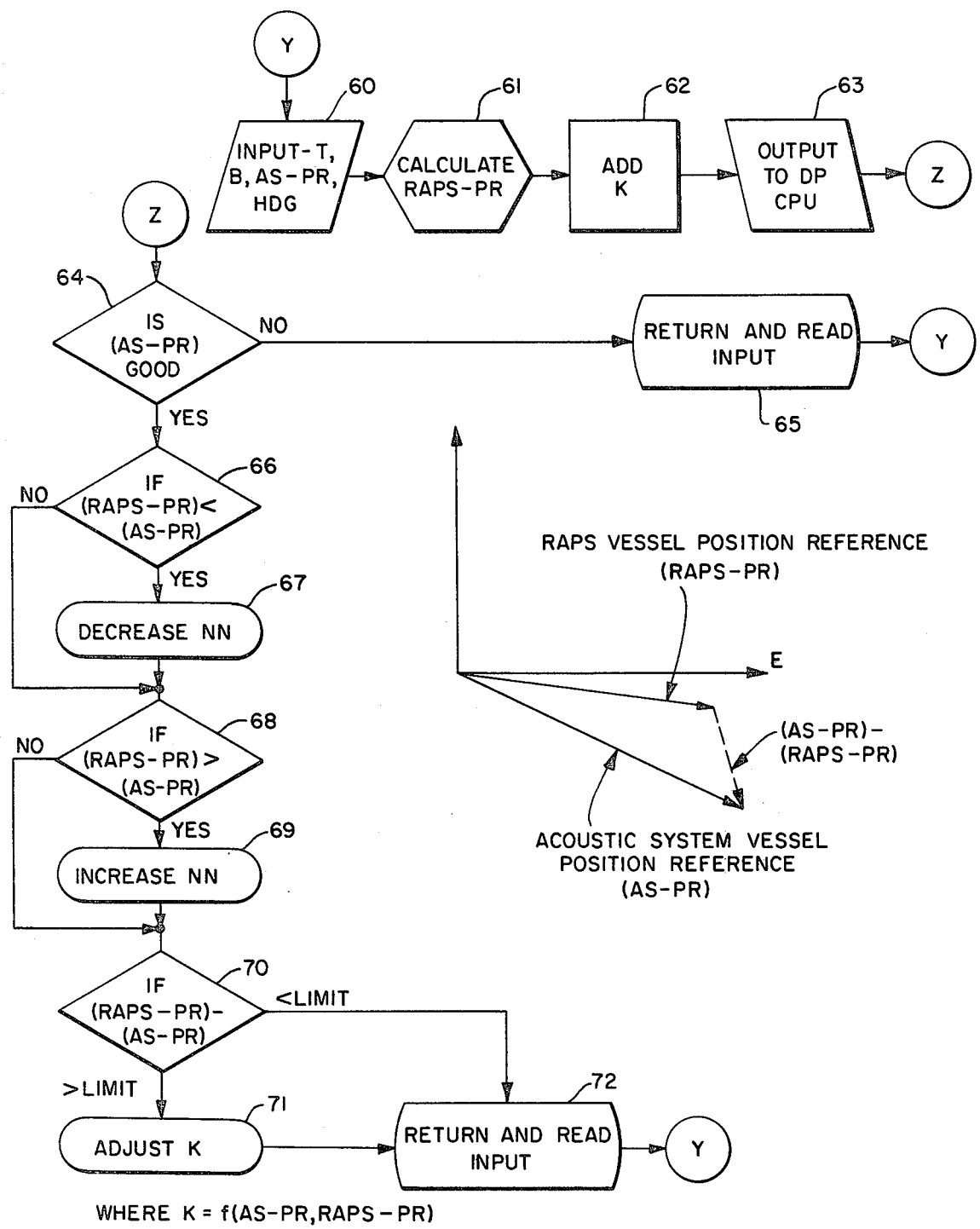
FIG. 4 is a general flowchart of the handling of data, in accordance with the riser angle positioning system and method, in calculating the vessel positioning information (for provision to the dynamic positioning system), in checking the validity of the acoustic data, and in adjusting parameters (for future use) if the acoustic data is determined to be good data.

FIG. 4 is a general flowchart of the handling of data, in accordance with the riser angle positioning system and method of the present invention. In general, the RAP system processor 40 (FIG. 2) calculates the vessel positioning information (for provision to the DPS system processor 50), checks the validity of acoustic data (from the acoustic system 46), and adjusts parameters (for future use) if the acoustic data is determined to be good data.

Referring in more detail to FIG. 4, the RAP system processor 40 is loaded with input data (block 60), including the upper riser angle data (T), the lower riser angle data (B), the RS-5B acoustic data (AS-PR), and the vessel gyro-compass information (from gyro-compass 48 of FIG. 2). From the latter information, the heading (HDG) of the vessel is calculated. In addition, from the latter input data, the system processor 40 calculates vessel positioning data RAPS-PR (block 61). Moreover, the system processor 40 adds a bias constant K (block 62), prior to providing the vessel positioning information (as well as acoustic data) to the DPS processor 50 (block 63).

Further referring to FIG. 4, the RAP system processor 40 compares present values of AS-PR (acoustic) data with past data to determine whether or not the acoustic data is good (block 64). If not good, the system processor 40 returns to read a further input (block 65). If, however, the acoustic data is good, the system processor 40 performs a further decision in terms of comparing the calculated positioning data RAPS-PR with the acoustic data AS-PR (block 66). In the latter regard, it is to be noted that, in FIG. 4, the RAPS-PR data is represented by a vector, indicating the RAP system vessel position reference, while the AS-PR acoustic data is represented by a vector, indicating the acoustic system vessel position reference. Thus, the difference between these two vectors is represented by the expression (AS-PS) - (RAPS-PR).

Returning to block 66, the system processor 40 compares the RAP system vessel position reference with the acoustic system vessel position reference. If the former is less than the latter, a parameter NN is decreased (block 67), indicating that the coordinates are changed to be indicative of the raising of the inflection point, while if the former is greater than the latter (block 68), the parameter NN is increased (block 69), coresponding to a lowering of the inflection point.

Subsequently, the system processor 40 makes a determination as to whether or not the difference vector (between the acoustic system vessel position reference and the RAP system vessel position reference) falls within certain threshold limits (block 70). If it does not fall within the limits, the bias constant K (which is a function of both the acoustic system vessel position reference and the RAP system vessel position reference) is adjusted (block 71). In any event, the system processor 40 then returns to read the next input (block 72).

FIGS. 5A through 5F are flowcharts of the operations performed by the RAP system processor 40 of FIG. 2, the processor 40 being programmed-controlled by a RAP program.

Figure 5A:
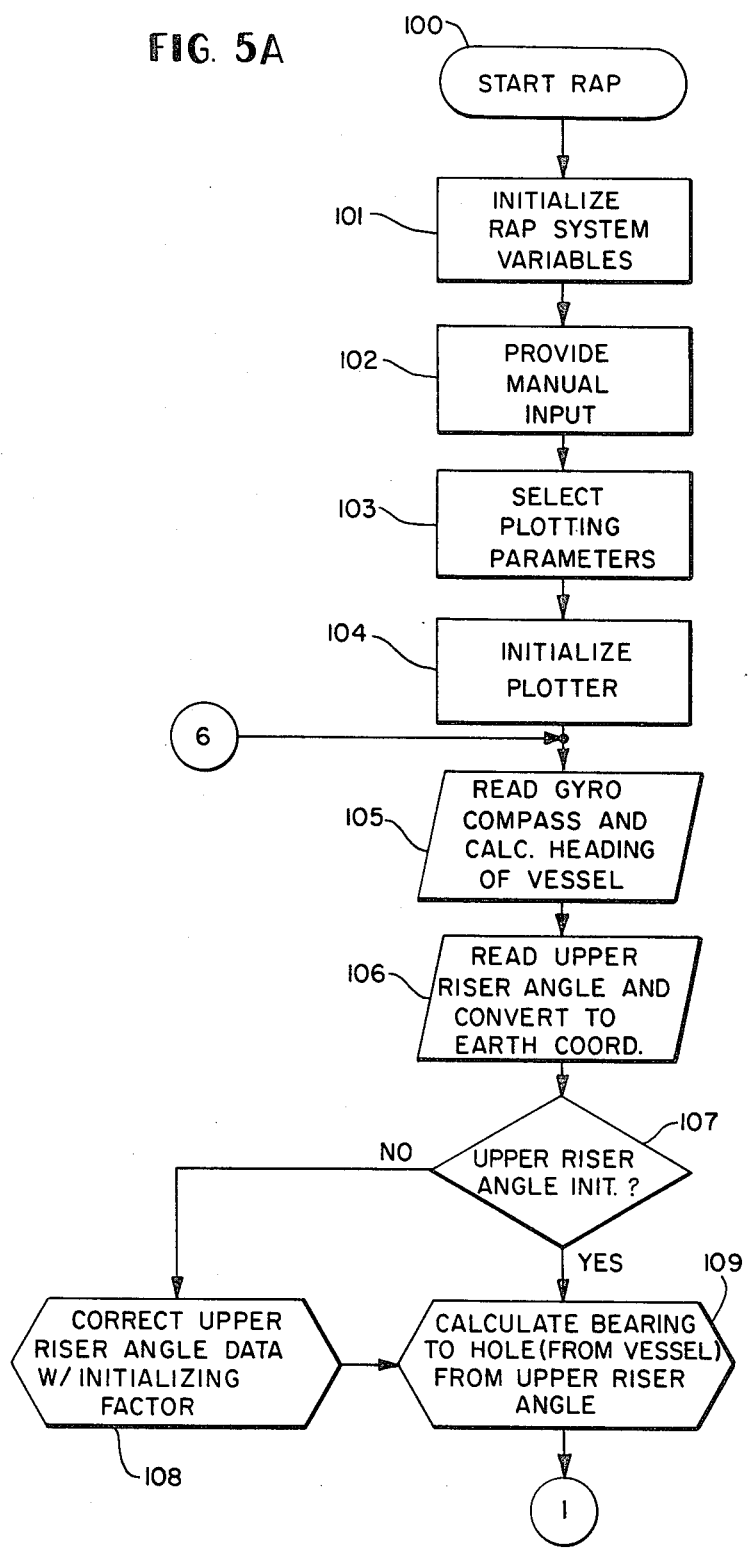

Referring to FIG. 5A, the RAP program, once loaded into the RAP system processor 40, will commence operations (block 100) by first initializing the RAP system variables (block 101), and then will request manual input from the operator (block 102). For example, the RAP program will query the operator as to where the input will be coming from (magnetic tape in the simulator mode, or ADC's 52 and 54 (FIG. 2) in the real time mode). After providing that information, the operator inputs the operating water depth (WD) and the mounting bearings of the upper and lower electric riser angle indicators. In addition, the operator identifies the parameters which he wishes to be plotted, and then instructs the system to proceed.

From this point on, operation of the RAP system program is automatic. A printer/plotter (associated, in a conventional way, with the RAP system processor 40) is initialized (block 104 of FIG. 5A), and the system processor 40 begins to read input data from the specified source (magnetic tape or ADC's 52 and 54). Data is, preferably, read by the system processor 40 in the following order:

(1) the gyro sine and cosine coordinates;
(2) the upper riser angle North and East coordinates (RAI);
(3) the lower riser angle North and East coordinates (ERA);
(4) the RS5 forward and starboard coordinates; and
(5) the RS5 alarms.

The RAP system processor 40, after reading the gyro compass, calculates the heading of the vessel (block 105). Then, the upper riser angle is read and converted to true North and East earth coordinates with the aid of the mounting bearings previously provided at start-up by the operator (block 106). In the latter regard, the equation at the top of FIG. 3 of the drawings (as previously discussed above) applies to this conversion.

At this juncture, the system makes a decision as to whether or not the upper riser angle is in need of initialization (block 107). This will be discussed in more detail below relative to block 120. If initialization is needed, this is accomplished by introducing an initializing factor (block 108). In any event, the system then calculates the bearing to the wellhead (or hole) from the vessel, utilizing the upper riser angle data (block 109). Again, the equations in FIG. 3 apply.

Figure 5B:
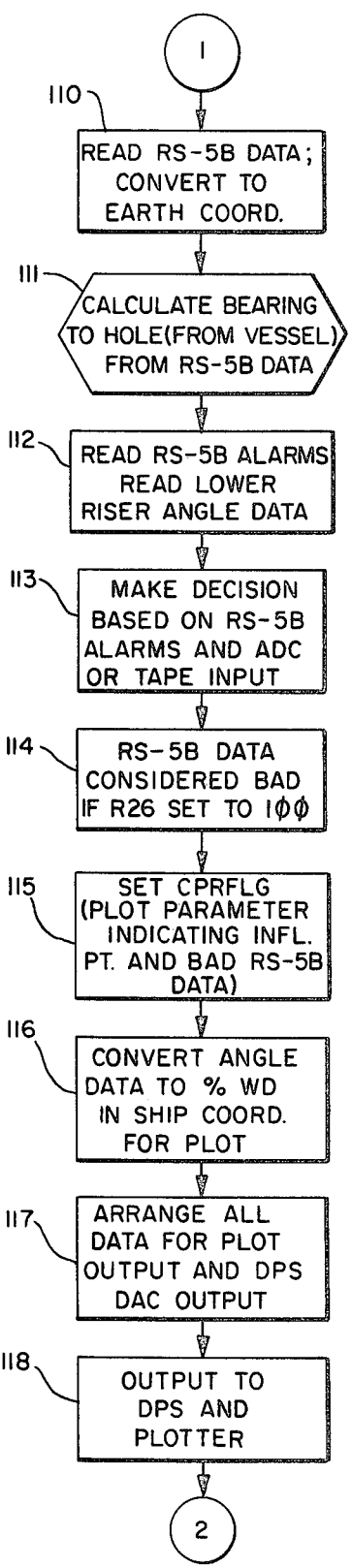

Turning to FIG. 5B, the system processor 40 then reads the RS-5B data (the acoustic data) and converts it to earth coordinates (block 110), utilizing the calculated vessel heading previously determined (block 105), to get the coordinates in true North and East coordinates. The system then calculates the bearing to the hole from the vessel, utilizing the RS-5B data (block 111). At this juncture, the system reads both the RS-5B alarms and the lower riser angle data (block 112).

The RAP system processor 40 then proceeds to make decisions based on the RS-5B alarms and the particular mode of operation (real time or simulator) selected by the operator (block 113). For example, the RS-5B data is considered bad if a certain storage location or register (designated R26) in the system processor 40 is set to a particular value, for example, 100 (block 114). A system flag CPRFLG is set, this flag comprising a plot parameter indicating an inflection point and/or whether or not the RS-5B data is bad (block 115). The system processor 40 then converts the angle data to percentage-of-water-depth in ship coordinates for plotting (block 116). All data thus far obtained is arranged for output to the plotter (associated, in a conventional manner, with the RAP system processor 40), as well as output to the DPS processor 50 via the DAC's 56 (blocks 117 and 118).

Referring to FIG. 5C, the RAP system processor 40 then subjects the calculated bearings from the vessel to the wellhead (as calculated from the RS-5B data and upper riser angle data, respectively) to a running average filter procedure (block 119). That is to say, the RS5 and riser angle coordinate data are filtered through a running average filter (implemented by the software of RAP system processor 40), the filtered values thus obtained being eventually passed on to a further portion of the software (to be discussed below) which performs position calculation and setting of the system offsets.

The system processor 40 then makes a decision as to whether or not the lower riser angle data is in need of initialization (block 120), as was done with respect to the upper riser angle data (block 107 discussed above).

More specifically, the reinitialization of upper and lower riser angle data is as follows.

The RAP system processor 40 periodically checks for inconsistencies in riser angle sensor data. It does this by monitoring the RS5 data, the inflection point, and the correction factors XO and YO. If the RS5 coordinates are within a range corrspanding to + or −0.5% of water depth, and if XO or YO (the correction factor) is within a range corresponding to + or −1% of water depth, or if the inflection point is greater than 80% or less than 30% of water depth, the average values of the riser angle coordinates are considered the initialized value of zero degrees angle and bearing. This is initially set on start-up, but experience has shown that the riser angle sensors (typically, implemented by devices known in the art as pendulum potentiometers) do not have close enough tolerance for the repetition required. Therefore, periodically, they must be reinitialized. This reinitialization is also required due to changes in environmental factors (wind, wave, current), due to changes in mud weight, due to changes in riser tension, and due to vessel offset.

The latter reinitialization procedure is implemented, with respect to the lower riser angle data, by introducing an initializing factor (block 121). Then, the system processor 40 calculates the bearing to the hole from the vessel, such calculation being performed from lower riser angle data (block 122). The RS-5B data is then converted from percentage-of-water- depth to offset in feet (block 123). All angle data from the RAP system calculations are then scaled (block 124). Then, the bottom riser angle data is filtered to compensate for water depth lag (block 125), and the lower riser angle and bearing data are then subjected to a running average filter procedure, so as to determine the inflection data (block 126). In the latter regard, the equations located at the center of FIG. 3 (previously discussed above) apply in performing this calculation.

Subsequently, the angular velocity at the top of the riser and the angular velocity at the inflection point are determined (blocks 127 and 128). The latter determinations will be described in more detail relative to a sample calculation (discussed below with reference to FIG. 6).

Referring to FIG. 5D, the system processor 40 then makes a decision as to whether or not a lossy integral filter flag LL is set to one (block 129). The setting of this flag is merely intended to coordinate consecutive execution, by the system processor 40, of the two portions of the software represented by blocks 130–135 and 136–143, respectively, of FIG. 5D.

Thus, presuming that LL is set to zero, the following operations are performed: the average time from the vessel to the inflection point is calculated (block 130); change in the angle and bearing between the vessel and the inflection point is determined (block 131); the acceleration (angular) at the top of the riser is determined (block 132); the actual time from the vessel to the inflection block is calculated (block 133); the offset (in feet) from the vessel to the inflection point is determined (block 134); and the lossy integral filter flag LL is set to one (block 135). The RAP system program then branches back to decision block 129, wherein the setting of LL to one causes execution of the following operations: the average time from the inflection point to the wellhead is calculated (block 136); the change in angle and bearing between the inflection point and wellhead is determined (block 137); the acceleration (angular) at the inflection point is determined (block 138); the actual time from the inflection point to the wellhead is calculated (block 139); the offset (in feet) from the inflection point to the wellhead is determined (block 140); the flag LL is set to zero (block 141); the total offset from vesel to wellhead is determined and converted to percentage-of-water-depth (block 142); and the data thus obtained is biased, filtered and converted to North-East coordinates (block 143).

With respect to the above calculation/determination operations, a detailed theoretical discussion of these operations is set forth below with reference to FIG. 6.

Referring now to FIG. 5E, the offset outputs (calculated above) are now ready for output (block 144). Specifically, in the real time mode, the offset outputs XTO and YTO are provided, via the DAC's 56 (FIG. 2), to the DPS processor 50 after being converted to engineering units of degrees North and degrees East. The DPS processor 50 will, in this mode, assume these data to be the lower riser angle, and will perform a straight line approximation for small angles to determine the vessel offset. However, in the simulator mode, the outputs XTO and YTO are converted into ship's coordinates to be plotted for reference to the RS-B5 (acoustic) input data (received by the RAP system processor 40 via the ADC's 54 (FIG. 2)).

Returning to FIG. 5E, the RAP system processor 40 determines the radius of error between the RS-5B data and the data calculated by the RAP system processor 40 (block 145). This radius of error will be used in developing the bias constants XO and YO (discussed below with reference to block 157 of FIG. 5F). The system processor 40 also filters the radius of error in the ship's coordinates (block 146).

Then, the RS-5B data is averaged and checked with past data to determine if the present RS-5B data is reasonable, that is, valid (blocks 147 and 148). If the RS-5B data is bad, a branch to a "return" routine (block 158 of FIG. 5F) is executed; that is, if the RS-5B data is not reliable, the system processor 40 sets a flag indicating that the inflection point and the XO, YO bias constants will not be changed until good RS-5B data is received (from the acoustic system 46), and the system processor 40 returns to read the next set of input data.

If, on the other hand, the RS-5B data is not bad, and if there are no RS-5B alarms, the average RS-5B data is compared to be unbiased RAPS data (block 149). The difference between the RS-5B data and the RAPS data is then compared to zero (block 150). If less than zero, the inflection point is lowered (block 151); if greater than zero, the inflection point is raised (block 152). This adjustment results in adjustment of the inflection point to ensure closer comparisons during the next cycle of the operation. The values, thus arrived at, for the inflection point and the bias constants XO, YO will be used by the RAP system processor 40 in calculating the vessel position utilizing the next set of data.

Referring to FIG. 5F, the system processor 40 then checks the biased RAP system-calculated data (XTO, YTO) with the RS-5B data (block 153). If XTO, YTO differ from the RS-5B data by more than a preset limit, a flag BADFLG is set and sent to the DPS processor 50 (block 153). In this eventuality (setting of the flag), a return branch is executed, and new data with new bias constants and a new inflection point are read (block 158). If, on the other hand, BADFLG is not set (block 154), the system processor 40 makes a check of an initialize flag (block 155). If the flat is set, the acoustic data RS-5B is checked, that is, the RS-5B coordinates are checked to see if they are less than 0.5% of the water depth (block 155). If the latter is the case, a return branch to block 158 is executed; if not, the system processor 40 is ready to update the bias constants XO, YO, and the radius of error between the data calculated by the RAP system processor 40 and the acoustic data RS-5B (as previously determined in block 145 (FIG. 5E)) is utilized to calculate new bias constants (block 157). Then, the system processor 40 returns and reads the next data with the new bias constants and inflection point (block 158). Finally, the system processor 40 returns to block 105 (FIG. 5A) to read the gyro compass and calculate the heading of the vessel, continuing the process as previously explained.

Figure 6:
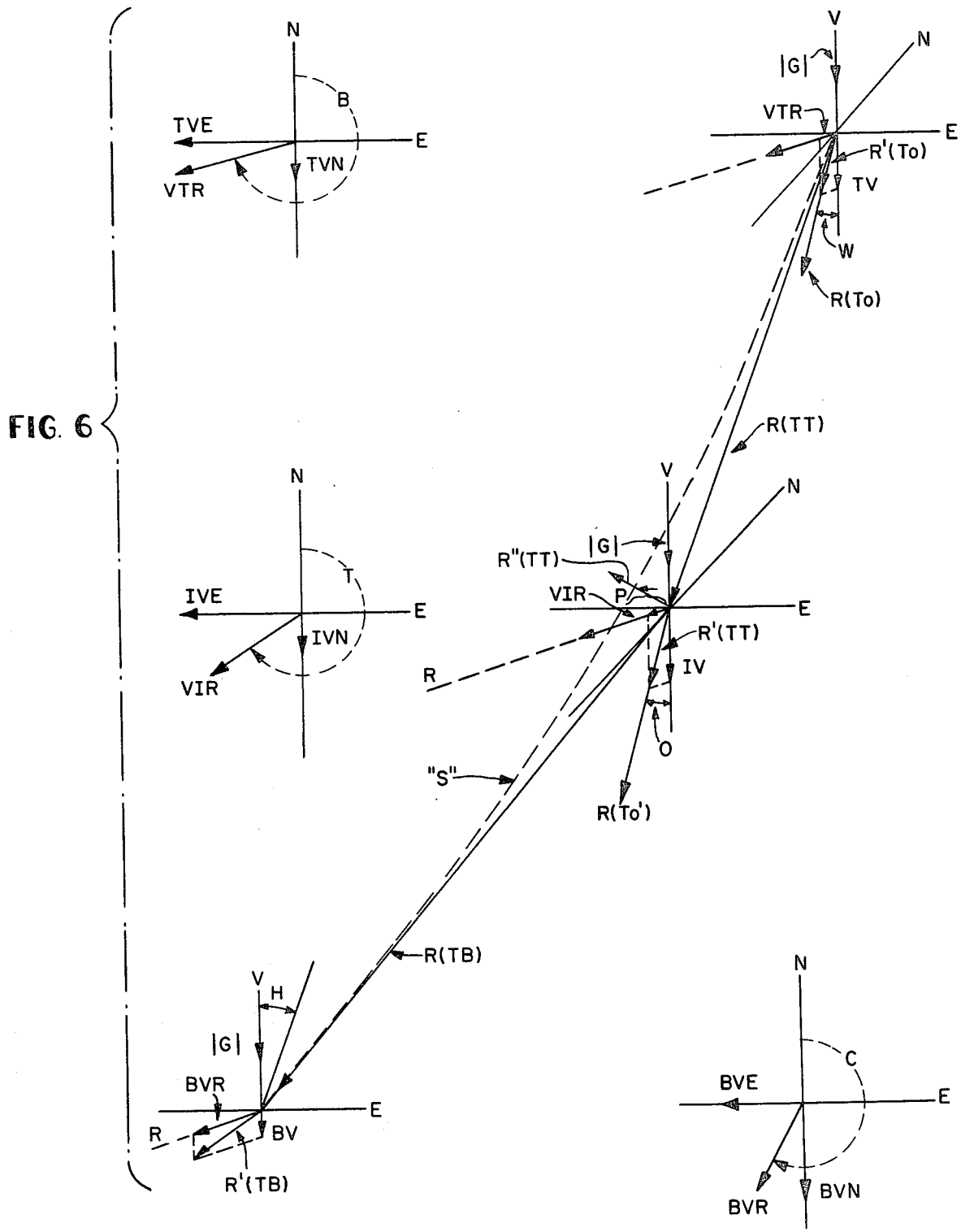
FIG. 6 is a diagram used in illustrating the manner in which the riser angle positioning system and method provides for calculation of the vessel position reference data and other needed parameters.

FIG. 6 is a diagram used in illustrating the manner in which the riser angle positioning system and method provide for calculation of the vessel position reference data and other needed parameters, mentioned above in the discussion of FIGS. 5A through 5F. Specifically, the calculation technique employed by the system and method of the present invention will be explained with respect to a sample calculation.

Referring to FIGS. 2, 5A through 5F and 6, once the RAP system processor 40 begins execution of its program, the vessel gyro-compass information is read via ADC's 52. Sample data would be as follows:
GYRO SIN = 0.000    GYRO COS = 1.000
From this information, the heading of the vessel is calculated (block 105).

Then (referring to blocks 106, 110 and 112), the upper riser angle data, lower riser angle data, and acoustic reference data are read, and are used to perform various calculations (for example, as discussed above with respect to blocks 109, 111, and 122). Thus, upper riser angle data, lower riser angle data and acoustic reference data are derived as follows:

| TOP RISER ANGLE DATA - RAI | | |
|---|---|---|
| FORWARD SENSOR VOLTS | = | 1.000 |
| STARBOARD SENSOR VOLTS | = | 2.000 |
| MOUNTING ANGLE | = | 360.000 |
| ANGLE | = | 3.198 |
| BEARING TO HOLE | = | 243.435 |
| BOTTOM RISER ANGLE DATA - ERA | | |
| FORWARD SENSOR VOLTS | = | −0.750 |
| STARBOARD SENSOR VOLTS | = | 4.000 |
| MOUNTING ANGLE | = | 0.000 |
| ANGLE | = | 5.820 |
| BEARING TO HOLE | = | 280.620 |
| WATER DEPTH (feet) | = | 5000.000 |
| INFLECTION POINT (NN) | = | 0.500 |
| ON LINE RS5 DATA | | |
| FORWARD RS5 VOLTS | = | 0.164 |
| STARBOARD RS5 VOLTS | = | 3.938 |
| VESSEL HEADING | = | 0.000 |
| RS5 VESSEL TO HOLE BEARING | = | 267.615 |
| RS5 VESSEL OFFSET | = | 7.883 |
| NORTH OF HOLE | = | 0.328% |
| EAST OF HOLE | = | 7.876% |

In addition, inflection angle data are obtained as follows: ANGLE = 4.509   BEARING TO HOLE = 262.027°

Then (referring to blocks 117 and 118), the system processor 40 provides, as an output, various offset and percentage-of-water-depth offset information, as follows:

OFFSET FROM VESSEL TO INFLECTION POINT:
NORTH = 44.874 FEET
EAST = 159.757 FEET
OFFSET FROM INFLECTION POINT TO WELLHEAD:
NORTH = 9.673 FEET
EAST = −222.293 FEET
TOTAL PERCENT W.D. OFFSET:
NORTH = 0.704
EAST = 7.641

A sample calculation will now be further discussed with reference to the following given information:

| | | | |
|---|---|---|---|
| 1. | The velocity of a particle following in a riser = G = 33.346 FT/SEC. | | |
| 2. | The origin of the three dimensional coordinate system is the tensioner ring on the outer barrel of the slip joint. | | |
| 3. | TOP RISER ANGLE, W = 3.19758 | = | 3.19578 |
| | INFLECTION POINT RISER ANGLE, O | = | 4.50863 |
| | BOTTOM RISER ANGLE, H | = | 5.81968 |
| | TOP RISER ANGLE BEARING, B | = | 243.44494 |
| | INFLECTION POINT RA BEARING, T | = | 262.02731 |
| | BOTTOM RISER ANGLE BEARING, C | = | 280.61966 |
| 4. | The derivative of the position vector (DR(T)/DT) = velocity of the particle at time T and is tangent to the riser at that point. | | |
| 5. | The derivative of (DR(T)/DT) = the acceleration of the particle at time T and is perpendicular to (DR(T)/DT) at that point. | | |

Referring to the diagram of FIG. 6, where $R(T) = (x(t), y(t), z(t))$ is the position vector of a moving point in space, then R(T) (or the end point thereof) generates a space curve "S". The vector R'(TT). taken with its initial point P or R(TT), lies on the tangent line to "S" at P. In case T is interpreted as the time during which the moving point is at P, R'(TT) is the velocity vector and R"(TT) is the acceleration vector of the moving point at time TT. Again, |R'(TT)| is the speed of the moving point at time TT.

These principles are used in the RAP system and method by first equating the curve "S" to the riser being used. The speed of the moving point, G (ft/sec), is a function of riser size and some mud flow rate (not zero), and is a constant for the particular riser |R'(T)|. With the velocity vector broken down into its X, Y and Z components, acceleration between different points P on the riser can be obtained by observing the change in the velocity components between the points, and the time required for the change to occur can be calculated using the known distance (water depth) or along the Z axis.

With the acceleration and the velocity components for different points P being known, the distance travelled by the point P in the X and Y directions can be determined.

The above-discussed sample calculation is further carried out in accordance with the following steps, corresponding to various blocks of FIGS. 5A through 5F (previously discussed):

(1) Find the projection of (DR(T)/DT), a first-order derivative, on the V axis and the R axis between the top of the riser and the inflection point-
 (A) At the top (block 127):
  TV = 33.29409    = G*COS(W)-FT/SEC
  VTR = 1.86002    = G*SIN(W)-FT/SEC
 (B) At the inflection point (block 218):
  IV = 33.243    = G COS(0)-FT/SEC -continued (2) VIR = 2.62130 = G*SIN(0)-FT/SEC
Find the average time for the particle to travel from the top to the inflection point on the V axis (block 130):
TAV = 75.14627 = 2*L*NN/(TV+IV)-SECS (3) Find the acceleration of the particle at the inflection point on the V axis:
DVDT1 = 0.00034 = (IV-TV)/TAV-FT/SEC**2

(4) Integrating the acceleration DVDT1 along the V axis results in the following:
V = DVDT1*T**2*(½)+TV*TK1
Knowing V = (water depth)*NN% (inflection point), K1=0., and DVDT1, solve for the time TT required to go from the origin to the inflection point (block 133):
TT = 75.03445=(-TV+/-SQRT (TV**2-2*DVDT1*L*NN))/ DVDT1-SECS (5) Find the projections of VTR and VIR on the North and East earth coordinates:
IVN = -0.36358 = VIR*COS(T)-FT/SEC
IVE = -2.59597 = VIR*SIN(T)-FT/SEC
TVN = -0.83182 = VTR*COS(R)-FT/SEC
TVE = -1.66365 = VTR*SIN(B)-FT.SEC (6) Find the acceleration of the particle at the inflection point for the North and East components (block 138):
DVDT3 = 0.00312 = (IVN-TVN)/TAV-FT/SEC**2
DVDT4 = -0.00620 = (IVE-TVE)/TAV-FT/SEC**2

(7) Knowing the time required going from the top of the riser to the inflection point, from (4), the North and East accelerations, from (6), and the initial velocities TVN and TVE, from (5), solve the quadratic equation in (4), and find the North and East coordinates from the origin to the inflection point (block 134):
XT = -44.87424 = (DVDT3*TT**2)/2+TVN*TT-FEET
YT = -159.75693 = (DVDT4*TT**2)/2+TVE*TT-FEET (8) Find the projection of (DR(T)/DT) on the V axis and the R axis between the inflection point and the wellhead
(A) At the inflection point:
IV = 33.24281 = G*COS(0)-FT/SEC
VIR = 2.62130 = G*SIN(0)-FT/SEC
(B) At the bottom:
BV = 33.17413 = G*COS(H)-FT/SEC
VBR = 3.38122 = G*SIN(H)-FT/SEC (9) Find the average time for the particle to travel from the inflection point to the bottom on the V axis (block 136):
BAV = 75.28199 = 2*L*(1-NN)/(IV+BV)-SECS

(10) Find the acceleration of the particle at the bottom for the V axis component (block 138):
DVDT2 = -0.00046 = (BV-IV)/BBV-FT/SEC**2

(11) As in (4), find the time TB required to go from the inflection point to the wellhead (block 139):
TB = 75.12728 =(-IV +/-SQRT (IV**2-2*DVDT2*L* (1-NN))/DVDT2-SEC

(12) Find the projections of VIR and VBR on the North and East earth coordinates:
BVN = 0.72312 = BVR*COS(C)-FT/SEC
BVE = -3.32330 = BVR*SIN(C)-FT/SEC
IVN = -0.36358 = VIR*COS(T)-FT/SEC
IVE = -2.59597 = VIR*SIN(T)-FT/SEC

(13) Find the acceleration of the particle at the wellhead for the North and East components:
DVDT5 = 0.00655 = (BVN-IVN)/BAV-FT/SEC**2
DVDT6 = -0.00483 = (BVE-IVE)/BAV-FT/SEC**2

(14) Knowing the time required to go from the inflection point to the wellhead, from (11), the North and East accelerations, from (13), and the initial velocities IVN and IVE, from (12), solve the quadratic equation in (4), and find the North and East coordinates from the inflection point to the wellhead (block 140):
XB = 0.77333 = ((DVDT5*TB**2)/2)+IVE*TB-FEET
YB = -222.29323 = ((DVDT6*TB**2)/2)+IVE*TB-FEET

(15) By summing the X and Y components, find the coordinates of the R(T) vector from the origin to the wellhead (in feet). To provide the vessel offset from the wellhead, the signs must be changed and the units converted to percent-of-water-depth (block 142):
NORTH = 0.70402 = XT+XB-% WATER DEPTH -continued

EAST = 7.64100 = YT+YB-% WATER DEPTH

(16) These values are then compared to the RS5 values and converted to North and East coordinates, and values for K1 are assigned to be used in the next calculation of R(T) in steps (7) and (14) (block 143).

It is to be noted that, in the preferred embodiment, when the RAP system processor 40 is operating in the simulator mode, the above-described procedure and all of the calculations and logic performed in connection therewith are performed for a given length of time (for example, once a second). However, in the real time mode, the system processor 40 performs those operations much more frequency (for example, five times a second).

Finally, the reinitialization feature of the RAP system and method of the present invention is worthy of additional discussion. As previously noted, the riser angle sensors (top and bottom inclinometers 42 and 44) are, preferably, pendulum potentiometers which detect variance from the vertical of the riser. Since these sensors are field-mounted, there must be some allowance made for sensor-mounting tilt, since the vessel is moving continuously. That is to say, it is extremely difficult to ensure exact vertical mounting. Once the riser is connected to the wellhead, and the proper tension has been pulled on the riser, the RAP system processor 40 initializes at that time when the RS-5B data indicates that the vessel is within one-half of one percent of the water depth of the hole (wellhead). When the RAP system processor 40 initializes, it freezes values of the upper and lower riser angle coordinates, and subtracts these values from all subsequent readings. If the tension and/or mud weight changes, these initialization constants most probably will be in error. Therefore, the RAP system processor must reinitialize at the first opportunity. This will occur when the RS-5B data indicates the vessel to be within one-half of one percent of the water depth of the hole (wellhead). Due to the set-up procedure typically employed in the DPS processor 50, with respect to the acoustic and the lower riser angle systems, it has been found that the RAP system initialization should also be performed during vessel turn. Therefore, the initialization flag is set if the heading of the vessel changes by a specified amount during a set period of time. When the flag is set, the RAP system processor 40 will initialize when the RS-5B data indicates that the vessel is within one-half of one percent of the water depth of the hole. As a result of this unique feature of the present invention, vessel positioning and tracking by the RAP system and method of the present invention have been exceptionally reliable, despite water turbulence, weather conditions, etc.

SUMMARY OF THE MAJOR ADVANTAGES OF THE INVENTION

After reading and understanding the foregoing description of the invention, in conjunction with the drawings, it will be appreciated that several advantages of the subject riser angle positioning system and method are obtained.

Without attempting to set forth all of these desirable features of the riser angle positioning system and method, at least some of the major advantages of the invention include the provision of a riser angle positioning system and method for geometrically determining the position of a vessel by obtaining the top and bottom riser slopes, together with an interpolated slope intermediately located by comparing the calculated position with that of a known position reference (such as is obtainable by means of an acoustic system).

The riser angle positioning system and method of the present invention provide exceptional accuracy in vessel positioning, as well as a backup system in the case of acoustic blackout, such being provided by employing a riser extending from the ocean floor to a floating vessel, wherein riser angle sensors are employed in conjunction with both the riser angle positioning system and an acoustic system so as to generate data for use in positioning the vessel.

Moreover, further accuracy is achieved by the present invention as a result of employing a positioning system and method which utilizes the riser angle sensors to create a dynamic model of the riser to determine vessel position, the riser angle at the middle of the riser being determined by interpolating data (in accordance with the dynamic model) generated by the acoustic system plus data generated by the inclinometers at the top and bottom of the riser.

Furthermore, the efficiency and accuracy of the system are much improved with respect to the prior art by providing a system and method which fit a three-dimensional, second-order algorithm between the top of the riser and an intermediate point on the riser, and which then fit the curve between the intermediate point and the bottom point of the riser, the vessel positioning information being calculated by means of the three-dimensional, second-order algorithm by performing a comparison between calculated distances and distances derived from the acoustic system, such technique being employed only if the acoustic data is considered to be valid by the system.

Finally, in accordance with a further inventive feature of the present system and method, if bad acoustic data is detected by the system, it is rejected and the operator is notified, the intermediate point and the algorithm constants being frozen until the system indicates that the acoustic data can be used as valid data.

In describing the invention, reference has been made to a preferred embodiment and illustrative advantages of the invention. Those skilled in the art, however, and familiar with the instant disclosure of the subject invention, may recognize additions, deletions, modifications, substitutions, and/or other changes which will fall within the purview of the subject invention and claims.

What is claimed is:

1. A riser angle positioning system for positioning a floating vessel having a riser extending to an ocean floor, said system comprising:
   acoustic means on the ocean floor for generating acoustic signals;
   sensor means, one positioned at the top of said riser and one positioned at the bottom of said riser, for generating respective sensor signals indicating the respective angles of said riser at said top and bottom, respectively, of said riser;
   compass means for providing coordinate data;
   converting means for converting said acoustic signals to acoustic data; and
   processor means responsive to said acoustic data from said converting means, to said respective sensor signals from said sensor means, and to said coordinate data from said compass means for processing said acoustic data and said respective angles of said riser at the top and bottom, respectively, of said riser, and for deriving positioning data for positioning said floating vessel.

2. A riser angle positioning system as defined in claim 1 wherein:
   said compass means comprises a gyro-compass on the floating vessel.

3. A riser angle positioning system as defined in claim 2, wherein:
   said coordinate data is analog in form, and said system further comprises converting means for converting said coordinate data to digital form prior to provision to said processor means.

4. A riser angle positioning system as defined in claim 1, wherein:
   said acoustic signals and said respective sensor signals are analog in form, said acoustic data are digital in form, and said converting means converts said respective sensor signals to digital form prior to provision of said acoustic data and said respective sensor signals to said processor means.

5. A riser angle positioning system as defined in claim 1, wherein:
   said system is connected to a dynamic positioning system processor; and
   said system further comprises transmitting means for transmitting said positioning data to said dynamic positioning system processor.

6. A riser angle positioning system as defined in claim 5, wherein:
   said positioning data is digital in form, and said transmitting means comprises at least one digital-to-analog converter for converting said positioning data to analog form prior to transmission to said dynamic positioning system processor.

7. A riser angle positioning system as defined in claim 1, wherein:
   said processor means interpolates said acoustic data and said respective angles of said riser to determine an interpolated angle at an intermediate point of the riser.

8. A riser angle positioning system as defined in claim 7, wherein:
   said processor means fits a curve between the top of the riser and the intermediate point of the riser, and then fits the curve between the intermediate point of the riser and the bottom of the riser.

9. A riser angle positioning system as defined in claim 8, wherein:
   said curve is represented by a three-dimensional, second-order algorithm.

10. A riser angle positioning system as defined in claim 8, wherein:
    said curve is tangent to the riser angle at the top of the riser and tangent to the interpolated angle at the intermediate point of the riser, and is tangent to the interpolated angle at the intermediate point of the riser and tangent to the riser angle at the bottom of the riser.

11. A riser angle positioning system as defined in claim 1, wherein:
    said processor means utilizes certain algorithm constants to develop intermediate point data, and analyzes said acoustic data to determine whether it is good or bad, said system further comprises means responsive to a determination of bad acoustic data for rejecting said bad acoustic data and for freezing said intermediate point data and said algorithm constants until said system indicates that the acoustic data can be used as valid data.

12. A riser angle positioning system as defined in claim 1, wherein:
said processor means develops intermediate point data, and analyzes said acoustic data to determine whether it is good or bad, said system further comprises means responsive to a determination of bad acoustic data for rejecting said bad acoustic data and for freezing said intermediate point data until said system indicates that the acoustic data can be used as valid data.

13. A riser angle positioning system as defined in claim 1, said system further comprises:
storage means for holding various parameters and constants; and
said processor means operating in a simulator mode of operation to receive and utilize said various parameters and constants to provide accurate processing to tune the system.

14. A riser angle positioning system as defined in claim 13, wherein:
said processor means operates in a real time mode of operation to receive analog data inputs corresponding to said acoustic data and said respective angles of said riser at the top and bottom, respectively, of said riser, and processes said analog data inputs to derive analog position reference signals comprising said positioning data for positioning said floating vessel.

15. In a positioning system for positioning a floating vessel having a riser extending between said floating vessel and an ocean floor, wherein acoustic signals are generated from the ocean floor, a riser angle positioning method comprising the steps of:
receiving said acoustic signals;
converting said acoustic signals to acoustic data;
generating measurement signals corresponding to measurement of respective angles of said riser at said top and said bottom, respectively, of said riser;
generating coordinate data;
processing said acoustic data, said measurement signals and said coordinate data to derive positioning data; and
applying said positioning data to said positioning system for positioning said floating vessel.

16. A riser angle positioning method as defined in claim 15, wherein:
said coordinate data is analog in form, and further comprising the additional step of converting said coordinate data to digital form prior to processing said coordinate data.

17. A riser angle positioning method as defined in claim 15, wherein:
said acoustic signals and said respective sensor signals are analog in form, and said converting step comprises converting said acoustic signals and said respective sensor signals to digital form prior to processing said acoustic data and said respective angles of said riser at said top and bottom, respectively, of said riser.

18. A riser angle positioning method as defined in claim 15 wherein:
said positioning system includes a dynamic positioning system processor; and
said applying step comprises transmitting said positioning data to said dynamic positioning system processor.

19. A riser angle positioning method as defined in claim 18, wherein:
said positioning data is digital in form, and further comprising the step of converting said positioning data from analog form prior to transmitting said positioning data to said dynamic positioning system processor.

20. A riser angle positioning method as defined in claim 15, wherein:
said processing step includes interpolating said acoustic data and said respective angles of said riser to determine an interpolated angle at an intermediate point of the riser.

21. A riser angle positioning method as defined in claim 20, wherein:
said processing step includes fitting a curve between the top of the riser and the intermediate point of the riser, and then fitting the curve between the intermediate point of the riser and the bottom of the riser.

22. A riser angle positioning method as defined in claim 21, wherein:
said curve is represented by a three-dimensional, second-order algorithm.

23. A riser angle positioning method as defined in claim 21, wherein:
said curve is tangent to the riser angle at the top of the riser and tangent to the interpolated angle at the intermediate point of the riser, and is tangent to the interpolated angle at the intermediate point of the riser and tangent to the riser angle at the bottom of the riser.

24. A riser angle positioning method as defined in claim 15, wherein said processing step includes:
using certain algorithm constants to develop intermediate point data;
analyzing said acoustic data to determine whether it is good or bad; and
rejecting said acoustic data determined to be bad and freezing said intermediate point data and said algorithm constants until it is indicated that the acoustic data can be used as valid data.

25. A riser angle positioning method as defined in claim 15, wherein said processing step includes:
developing intermediate point data;
analyzing said acoustic data to determine whether it is good or bad; and
rejecting said acoustic data determined to be bad and freezing said intermediate point data until it is indicated that the acoustic data can be used as valid data.

26. A riser angle positioning method as defined in claim 15 and further comprising the step of:
storing various parameters and constants; and
said processing step includes establishing a simulator mode of operation and, in said simulator mode of operation, receiving and utilizing said various parameters and constants to provide accurate processing in said processing step.

27. A riser angle positioning method as defined in claim 26, wherein said processing step further comprises:
establishing a real time mode of operation;
receiving in said real time mode of operation analog data inputs corresponding to said acoustic data and said respective angles of said riser at the top and bottom, respectively, of said riser; and processing said analog data inputs to derive analog position reference signals comprising said positioning data for positioning said floating vessel.

28. In a positioning system for positioning a floating vessel having a riser extending between said floating vessel and an ocean floor, wherein acoustic signals are generated from the ocean floor, a riser angle positioning method comprising the steps of:
receiving said acoustic signals;
converting said acoustic signals to acoustic data;
generating measurement signals corresponding to measurement of respective angles of the riser at the top and bottom, respectively, of the riser;
initially approximating an inflection point as being located midway between the top and bottom of the riser;
determining, based on said acoustic data and in accordance with a two-axis X-Y coordinate system, the X and Y coordinates of the distance from the top of the riser to the inflection point, and the X and Y coordinates of the distance from the inflection point to the bottom of the riser;
adding the respective X and Y coordinates to obtain respective sums indicating the total separation between the top and bottom of the riser; and
applying said respective sums to said positioning system.

29. A riser angle positioning method as defined in claim 28, wherein said determining step comprises:
solving a second-order differential equation.

30. A riser angle positioning method as defined in claim 28, comprising the additional step of:
adding respective bias constants to the respective sums to get corrected sums indicating more accurately the total separation between the top and bottom of the riser.

31. A riser angle positioning method as defined in claim 30, comprising the additional step of:
filtering said corrected sums to indicate even more accurately the total separation between the top and bottom of the riser.

32. A riser angle positioning method as defined in claim 28, wherein said positioning system includes a dynamic positioning system, said method comprising the additional steps of:
establishing a real time mode of operation; and
providing said respective sums to said dynamic positioning system.

33. A riser angle positioning method as defined in claim 28, wherein said positioning system includes an acoustic system generating said acoustic signals, said method comprising the additional steps of:
establishing a simulator mode of operation; and
in said simulator mode of operation, comparing said respective sums to said acoustic data.

34. A riser angle positioning method as defined in claim 33, comprising the additional step of:
in said simulator mode of operation, converting said respective sums to earth coordinates prior to comparing said respective sums to said acoustic data.

35. A riser angle positioning method as defined in claim 28, wherein said positioning system includes an acoustic system generating acoustic signals corresponding to consecutive acoustic data including present and past acoustic data, said method comprising the additional step of:
comparing said present acoustic data with said past acoustic data to determine the reliability of said present acoustic data.

36. A riser angle positioning method as defined in claim 35, comprising the additional step of:
comparing the respective sums to said present acoustic data determined to be reliable.

37. A riser angle positioning method as defined in claim 28, comprising the additional step of:
analyzing said respective sums to determine the validity thereof.

38. In a positioning system for positioning a floating vessel in accordance with vessel positioning information and past and present acoustic data, a riser angle positioning method comprising the steps of:
(a) determining said vessel positioning information;
(b) approximating an intermediate point between the floating vessel and an ocean floor;
(c) comparing said past and present acoustic data to determine whether said present acoustic data is bad or good;
(d) returning to step (a) when said present acoustic data is determined to be bad;
(e) comparing said determined vessel positioning information with said present acoustic data determined to be good;
(f) increasing said intermediate point when said determined vessel positioning information is less than said present acoustic data; and
(g) decreasing said intermediate point when said determined vessel positioning information is greater than said present acoustic data; and
(h) applying said intermediate point and said positioning information to said positioning system, whereby to position said floating vessel.

39. A riser angle positioning method as defined in claim 38, wherein said determining step includes:
providing at least one bias constant for determining said vessel positioning information; and
said method comprises the additional steps of:
(h) computing a difference between the determined vessel position information and the present acoustic data;
(i) comparing said difference to predetermined limits to determine whether or not said difference falls within or outside said predetermined limits; and
(j) adjusting said at least one bias constant when said difference falls outside said predetermined limits.

40. In a positioning system for positioning a floating vessel in accordance with acoustic data, said floating vessel having a riser extending from a top thereof to a bottom thereof in the vicinity of a wellhead on an ocean floor, a riser angle positioning method comprising the steps of:
(a) determining a top angle of said riser at said top thereof;
(b) calculating, from said top angle of said riser, a first bearing of said wellhead from said floating vessel;
(c) determining said acoustic data;
(d) calculating, from said acoustic data, a second bearing of said wellhead from said floating vessel;
(e) determining a bottom angle of said riser at said bottom thereof;
(f) calculating, from said bottom angle of said riser, a third bearing of said wellhead from said floating vessel;

(g) determining an inflection point, including inflection point angle data, at a point intermediate between top and said bottom of said riser;
(h) determining a first offset between said floating vessel and said inflection point;
(i) determining a second offset between said inflection point and said wellhead;
(j) calculating, from said first and second offsets, a total offset from said floating vessel to said wellhead, said total offset comprising unbiased positioning data;
(k) adding a predetermined bias constant to said total offset to get a biased total offset comprising biased positioning data;
(l) repeating said steps (b) thru (l) a predetermined number of times to obtain successive positioning data for positioning said floating vessel; and
(m) applying said successive positioning data to said positioning system, whereby to position said floating vessel.

41. A riser angle positioning method as defined in claim 40, and further comprising the steps, between said steps (a) and (b) of:
determining when said upper riser angle is in need of initialization; and
correcting said upper riser angle in accordance with an initializing factor when said upper riser angle is in need of initialization.

42. A riser angle positioning method as defined in claim 41, comprising the additional step, after step (a), of:
converting said top angle of said riser to earth coordinates.

43. A riser angle positioning system as defined in claim 41, comprising the additional step (c), of:
converting said acoustic data to earth coordinates.

44. A riser angle positioning system as defined in claim 41, and further comprising the steps, after step (c), of:
determining whether said acoustic data is good or bad; and
setting a system flag to indicate whether said acoustic data is good or bad.

45. A riser angle positioning system as defined in claim 40 and further comprising the additional steps, between said steps (e) and (f), of:
determining when said bottom angle of said riser is in need of initialization; and
correcting said bottom angle of said riser in accordance with an initializing factor when said bottom angle of said riser is in need of initialization.

46. A riser angle positioning system as defined in claim 40, and further comprising the additional steps, after step (f), of:
converting said acoustic data from percentage-of-water depth to offset;
scaling said upper riser angle, said bottom angle of said riser, and said inflection point; and
filtering said bottom angle of said riser for water depth lag.

47. A riser angle positioning system as defined in claim 40, wherein said step (h) comprises:
calculating an average time from said floating vessel to said inflection point;
determining a change in angle and bearing between said floating vessel and said inflection point;
determining an angular acceleration at said top of said riser;
calculating an actual time from said floating vessel to said inflection point; and
determining said first offset therefrom.

48. A riser angle positioning system as defined in claim 40, wherein, said step (i) comprises:
calculating an average time from said inflection point to said wellhead;
determining a change in angle and bearing between said inflection point and said wellhead;
determining an angular acceleration at said inflection point;
calculating an actual time from said inflection point to said wellhead; and
determining said second offset therefrom.

49. A riser angle positioning system as defined in claim 40, and further comprising the additional steps, after said step (k), of:
determining whether said acoustic data is good or bad; and
executing said step (m) when said acoustic data is bad.

50. A riser angle positioning system as defined in claim 49, and further comprising the additional steps of:
determining, when said acoustic data is good, whether said acoustic data is greater or less than said unbiased positioning data;
decreasing said inflection point when said acoustic data is less than said unbiased positioning data; and
increasing said inflection point when said acoustic data is greater than said unbiased positioning data.

51. A riser angle positioning system as defined in claim 50, and further comprising the additional steps of:
checking said biased positioning data with said acoustic data to determine whether said biased positioning data is bad;
setting a flag when said biased positioning is bad; and
executing said step (m) when said flag is set.

52. A riser angle positioning system as defined in claim 51, and further comprising the additional steps of:
checking, when said flag is not set, whether or not initialization is required;
checking, when initialization is required, to see whether or not said acoustic data is less than a predetermined percentage of water depth;
determining radius of error coordinates and calculating said predetermined bias constant when said acoustic data is not less than said predetermined percentage of water depth; and executing said step (m).

53. A riser angle positioning system as defined in claim 40, and further comprising the additional steps, after said step (k) of:
checking said biased positioning data with said acoustic data to determine whether said biased positioning data is bad;
setting a flag when said biased positioning data is bad; and
executing said step (m) when said flag is set.

54. A riser angle positioning system as defined in claim 53, and further comprising the additional steps of:
checking whether or not initialization is required when said flag is not set;
checking, when initialization is required, to see whether or not said acoustic data is less than a predetermined percentage of water depth;
determining radius of error coordinates and calculating said predetermined bias constant when said acoustic data is not less than said predetermined percentage of water depth; and
executing said step (m).

* * * * *